US006966230B2

(12) United States Patent
Frenken

(10) Patent No.: US 6,966,230 B2
(45) Date of Patent: Nov. 22, 2005

(54) DYNAMOMETRIC TOOL

(75) Inventor: Egbert Frenken, Wermelskirchen (DE)

(73) Assignee: Gustav Klauke GmbH, (DE)

(*) Notice: Subject to any disclaimer, the term of this patent is extended or adjusted under 35 U.S.C. 154(b) by 0 days.

(21) Appl. No.: 10/398,999

(22) PCT Filed: Sep. 8, 2001

(86) PCT No.: PCT/EP01/10390

§ 371 (c)(1),
(2), (4) Date: Jul. 29, 2003

(87) PCT Pub. No.: WO02/32628

PCT Pub. Date: Apr. 25, 2002

(65) Prior Publication Data

US 2004/0011143 A1 Jan. 22, 2004

(30) Foreign Application Priority Data

Oct. 14, 2000 (DE) ................................ 100 51 010

(51) Int. Cl.[7] ................................ G01N 3/08
(52) U.S. Cl. ................................ 73/819
(58) Field of Search ................................ 73/819, 856, 860; 72/402, 397, 398

(56) References Cited

U.S. PATENT DOCUMENTS 2,821,877 A * 2/1958 Swanson ..................... 72/445
4,480,460 A * 11/1984 Bush et al. .............. 72/409.01
5,195,042 A * 3/1993 Ferraro et al. ............... 72/18.9
5,335,531 A * 8/1994 Mann et al. .................. 72/416
5,490,406 A * 2/1996 College ...................... 72/30.1
5,567,870 A * 10/1996 Harris ......................... 73/860
5,619,883 A * 4/1997 Dischler ...................... 72/400
5,934,136 A * 8/1999 Bracher et al. ............... 72/397
6,142,022 A 11/2000 Ruegg et al.
6,164,106 A * 12/2000 Nghiem et al. .............. 72/20.1
6,202,290 B1 * 3/2001 Kewitz et al. ................ 29/701
6,457,338 B1 * 10/2002 Frenken ...................... 72/20.1

FOREIGN PATENT DOCUMENTS

| | | |
|---|---|---|
| DE | 2814988 | 10/1979 |
| DE | 29602338 | 2/1996 |
| DE | 29604276 | 5/1996 |
| DE | 19616975 | 10/1996 |
| DE | 29815312 | 11/1998 |
| DE | 19619716 | 10/1999 |

* cited by examiner

*Primary Examiner*—Edward Lefkowitz
*Assistant Examiner*—T Miller
(74) *Attorney, Agent, or Firm*—Trexler, Bushnell, Giangiorgi, Blackstone & Marr, Ltd.

(57) ABSTRACT

A dynamometric tool uses a four-mandrel press. The press head is provided with a specific press geometry which is predefined by the mandrels. The dynamometric tool produces a tool which can determine the actual force of compression in an easy-to-handle manner. The dynamometric tool also has two levers which are joined together and adapted to the geometry of the press head, and which interact upon a pressure sensor during compression.

11 Claims, 9 Drawing Sheets

Fig. 14
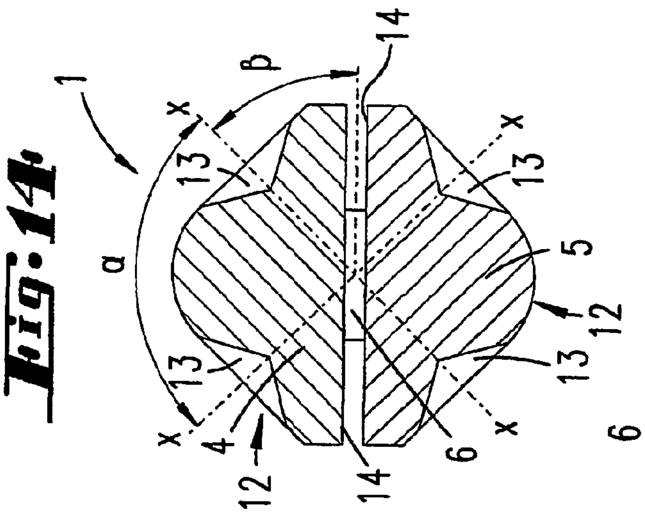
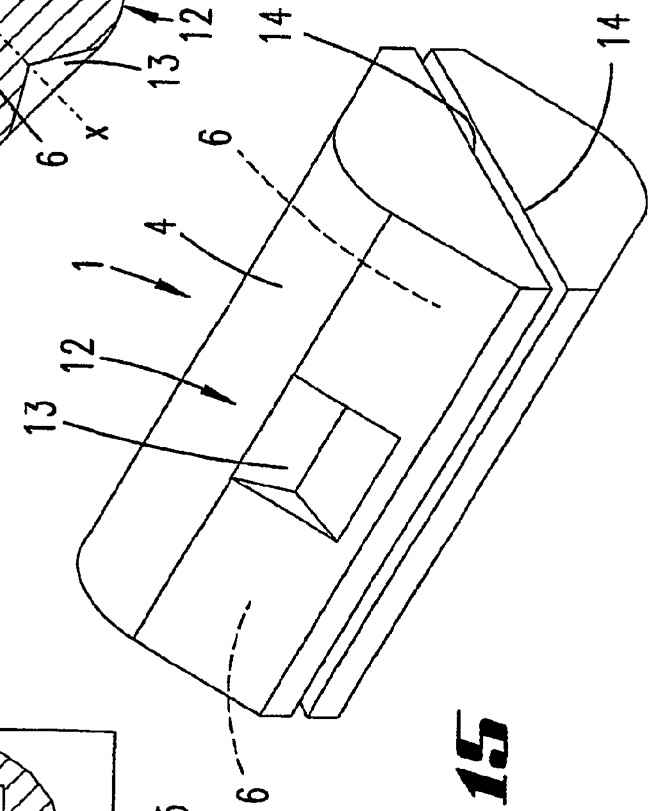
Fig. 15
Fig. 13
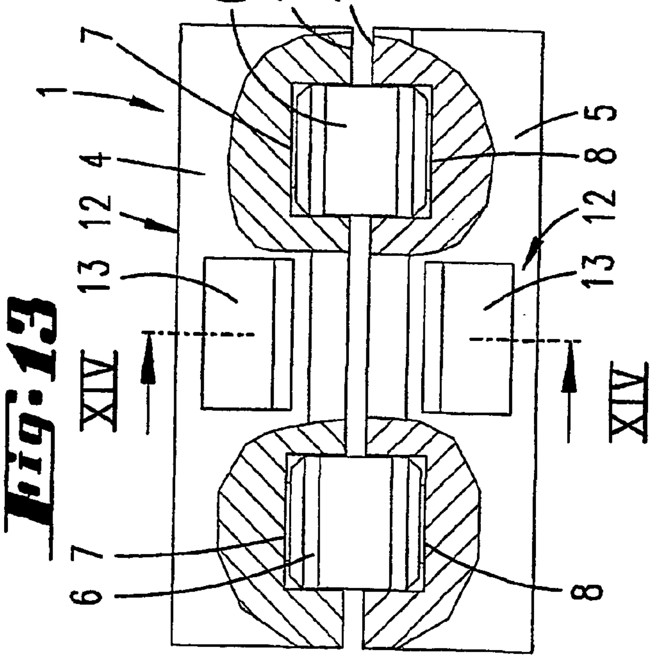

DYNAMOMETRIC TOOL

This is a National Phase application of PCT Application No. PCT/EP01/10390, filed Sep. 8, 2001, which claims priority from German Application No. 10051010.8, filed Oct. 14, 2000.

Four-mandrel press heads of this type are known. Reference is made here, for example, to Canadian Patent 679,495. One of the advantages of such press heads is that a new insert is not required for each geometry of a cable shoe or the like that is to be pressed with said press heads. The force with which pressing actually takes place is difficult to verify in the case of such four-mandrel press heads.

With regard to the prior art described above, one technical problem for the invention is seen as that of providing a dynamometric tool for a four-mandrel press head by means of which the actual pressing force can be determined in an easy-to-handle manner.

This problem is solved in the first instance and substantially by the subject-matter of Claim 1, which provides two levers which are joined together and adapted to the pressing geometry of the press head and which act on a pressure sensor in the course of pressing. In a preferred configuration, the dynamometric tool according to the invention is formed like a gage, as a hand-held device. The two levers of this dynamometric tool gage are adapted in the region to be associated with the four-mandrel press head to the pressing geometry predefined by the mandrels, with the result that the mandrels act on the dynamometric tool in the course of the test pressing operation in such a way that a measurement of the actual pressing force is achieved. The pressing forces introduced into the levers are determined by a pressure sensor disposed in the dynamometric tool, which determined value can, for example, be indicated. Storage of the determined value in the dynamometric tool is also conceivable. In an advantageous way, the dynamometric tool according to the invention is formed as a handy measuring gage, so that it can be used at any time, i.e. even in situ on a construction site, etc. It is provided in a development of the subject-matter of the invention that the levers are connected to each other at one end in a pivoted manner and, on the opposite side, end in a freely projecting manner. The pressure sensor is in this case disposed between the two levers interconnected in a pivoted manner, the way in which the levers are disposed in relation to each other further being chosen such that, in the unloaded state, these levers of the dynamometric tool, with the pressure sensor disposed in between, do not run parallel to each other but diverge. As a result of this configuration, the high forces which are introduced into the dynamometric tool during pressing can be transferred. It is also proposed that a receiving geometry for the press mandrels is respectively formed on the levers. Consequently, each lever is further adapted in its receiving geometry to the pressing geometry of two neighboring mandrels of the four-mandrel press head. In a further advantageous configuration, it is provided that the receiving geometry of each lever is chosen such that the mandrels of the four-mandrel press head act at an angle of preferably 45° to the plane between the two levers of the dynamometric tool. It further proves to be particularly advantageous that the pressure sensor is disposed at a spacing from the receiving geometry, with respect to the length of the levers. For example, with respect to the length of the levers, it is provided for the pressure sensor to be disposed between the receiving geometry and the pivoted connection of the levers. Since the force in the four-mandrel press head is transmitted in a predetermined ratio, it is proposed in an advantageous development of the subject-matter of the invention that this transmission is also provided in the dynamometric tool. It is consequently proposed that the ratio of the spacings of the pressure sensor on the one hand and the receiving geometry on the other hand from the pivoted connection of the levers is chosen such that the pressure sensor indicates the actual pressing force irrespective of the force transmission dictated by the way in which the mandrels are geometrically disposed. It is consequently preferred to transmit the force in the four-mandrel press head with a factor of "root 2". A corresponding transmission ratio is reproduced by the dimensions of the lever arms on the one hand and the location of the pressure sensor in relation to them on the other hand. In addition, the actual drive force can then be indicated. The ratio of the spacings of the pressure sensor and the receiving geometry from the pivoted connection of the levers is consequently likewise chosen as a "root 2" ratio. In an alternative configuration, it may be provided that the receiving geometry is disposed between the free end region, with which the pressure sensor is also associated, and the pivot. A ratio of the spacings of the pressure sensor and of the receiving geometry from the pivoted connection of the levers which is adapted to the force transmission in the four-mandrel press head is also preferably chosen here. Furthermore, it is alternatively provided that the receiving geometry is disposed midway along the levers and that pressure sensors are provided on both sides of the receiving geometry.

The invention relates furthermore to a dynamometric tool for a four-mandrel press head, the four-mandrel press head having a pressing geometry predefined by the mandrels. To develop a dynamometric tool of the type in question in an advantageous way, it is proposed that two thrust pieces which are adapted to the pressing geometry and act on a pressure sensor in the course of pressing are provided. This configuration produces a handy dynamometric tool, measurement of the actual pressing force being carried out by placing the dynamometric tool in the press head in such a way that the mandrels of the press head act on the thrust pieces adapted to the pressing geometry. The pressure sensor disposed between these thrust pieces thereby determines the pressing force in an extremely easy way. It proves to be particularly advantageous here that a receiving geometry for the press mandrels is formed on each of the thrust pieces, the receiving geometry of the two thrust pieces being joined together and adapted to the pressing geometry of the press head. Finally, it is proposed that the pressure sensor and the receiving geometries are disposed in the same region of the thrust pieces, with the result that the pressure sensor lies in the pressing plane, i.e. in the plane acted on by the four mandrels of the press head, in the course of the pressing for measuring purposes.

The invention is explained in more detail below on the basis of the accompanying drawing, which merely represents several exemplary embodiments and in which:

FIG. 13 shows a further embodiment of the dynamometric tool;

FIG. 14 shows the section along the line XIV—XIV in FIG. 13;

FIG. 15 shows the perspective representation of the dynamometric tool according to FIG. 13;

Figure 1:
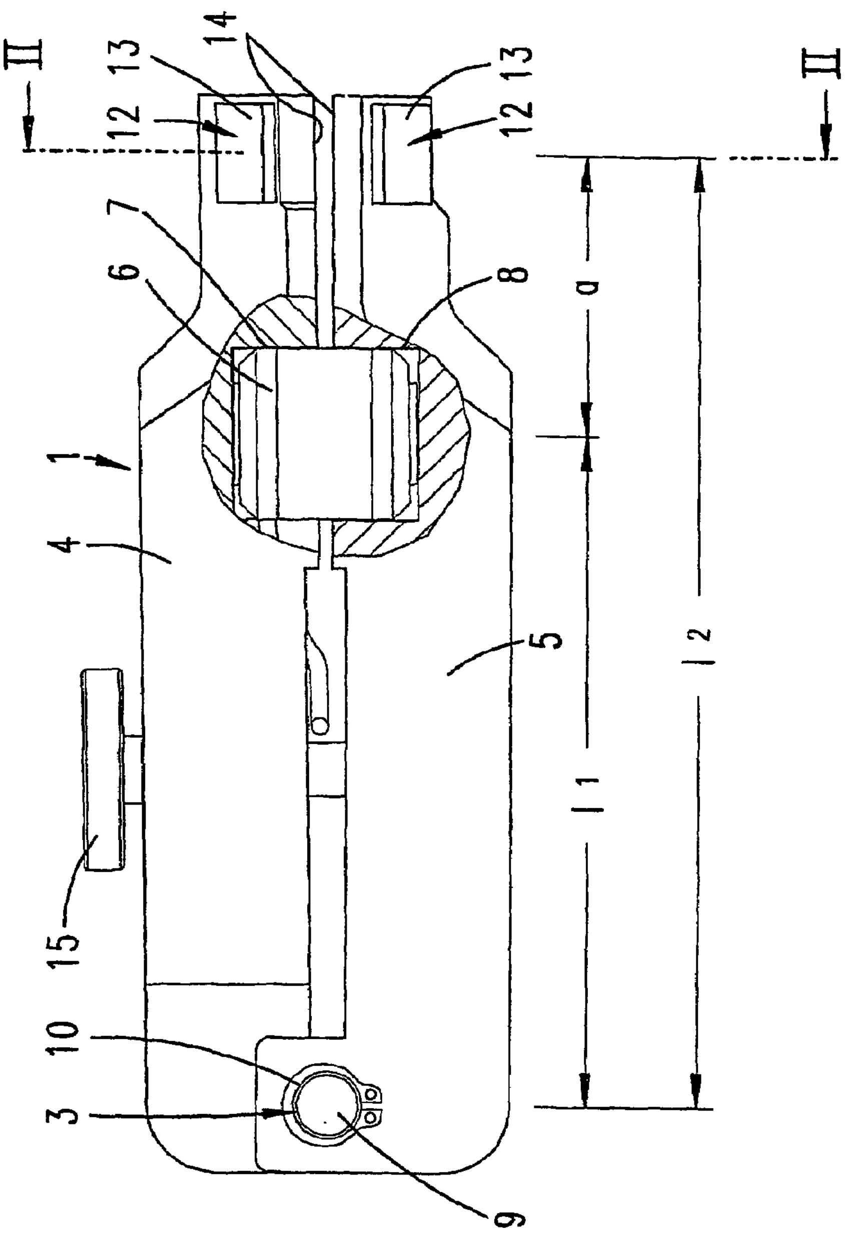
FIG. 1 shows a side view toward a dynamometric tool in a first embodiment.
Figure 4:
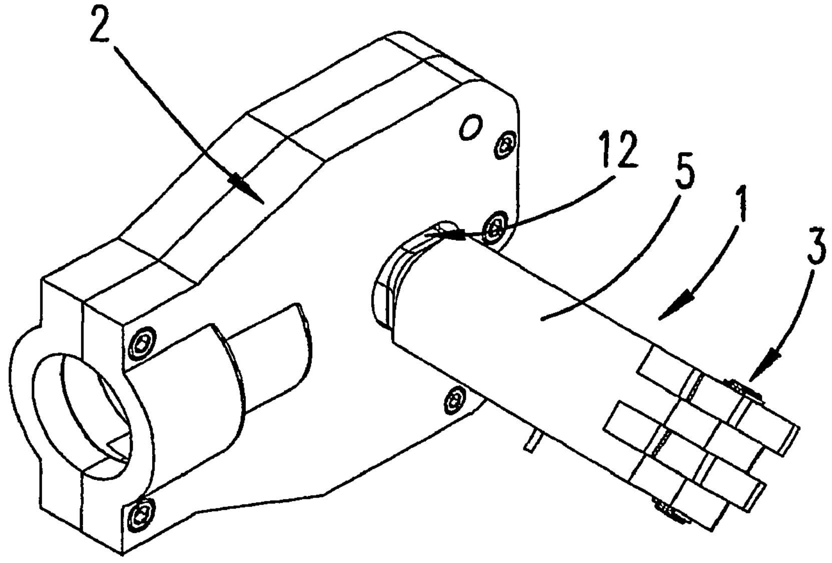
FIG. 4 shows the way in which the dynamometric tool according to the invention is associated with a four-mandrel press head in a perspective representation.

Represented and described, in the first instance with reference to FIG. 1, is a dynamometric tool 1 for a four-mandrel press head 2—as represented in FIG. 4. The first exemplary embodiment of the dynamometric tool 1, represented in FIGS. 1 to 7, substantially comprises two levers 4, 5, which are disposed parallel to each other, are connected to each other by means of a pivot point 3 and between which a pressure sensor 6 is disposed.

The set-up is further chosen such that, in a basic position, i.e. in the unloaded state, the levers 4 and 5 do not run parallel to each other but diverge from each other.

The pressure sensor 6 lies in receptacles 7, 8 extending from the mutually facing surfaces of the levers 4 and 5.

The pivot 3, formed at the one, free ends of the levers 4, 5, is formed by a pivot pin 9, which passes through the levers 4 and 5 and is captured at the ends on both sides by means of securing rings 10.

The freely projecting ends, lying opposite the pivot 3, of the levers 4 and 5 are formed in such a way that they are adapted to the pressing geometry predefined by the mandrels 11 of the press head 2, and accordingly have in each case a receiving geometry 12 for the press mandrels 11.

Figure 2:
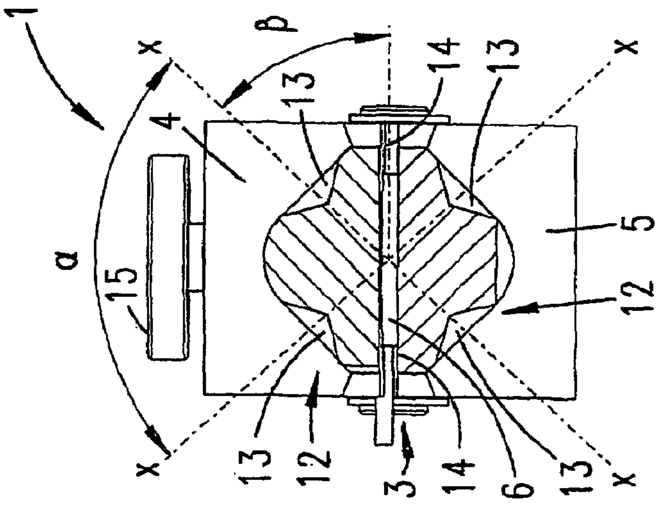
FIG. 2 shows the section along the line II—II in FIG. 1.
Figure 3:
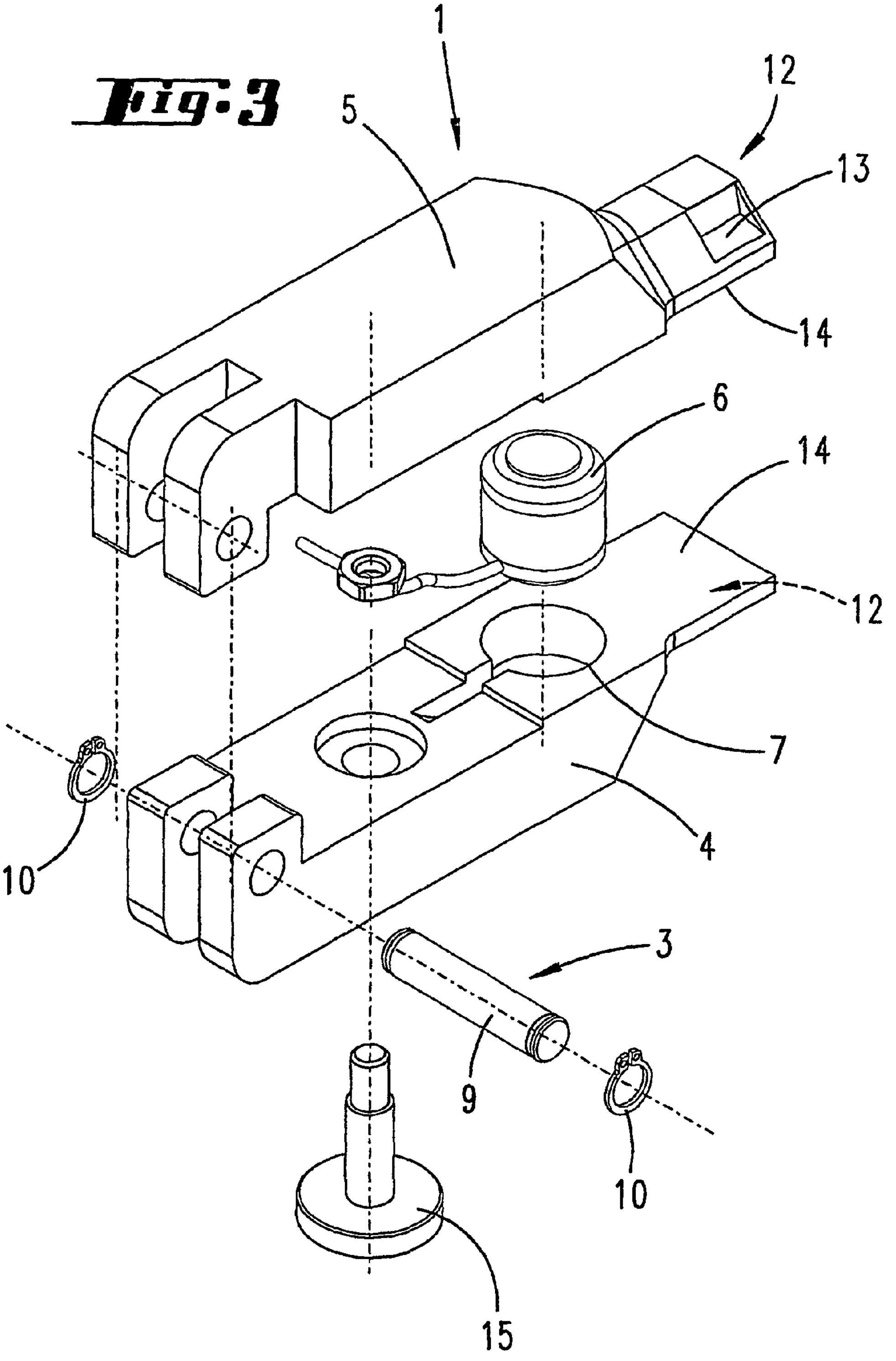
FIG. 3 shows the dynamometric tool of the first embodiment in a perspective exploded representation.

Each receiving geometry 12 is accordingly formed by two cross-sectionally triangular depressions 13, the way in which these depressions 13 are associated with each other being chosen such that, in a cross-section according to FIG. 2, the axes of symmetry x form an angle alpha of 90°, each axis of symmetry x being aligned furthermore at an angle beta of 45° in relation to the parting surface 14 of the respective lever, facing the opposite lever.

As can be seen in FIG. 2, the receiving geometry 12 of the freely projecting ends of lever 4 and lever 5 are disposed symmetrically in relation to the parting plane formed between the levers 4 and 5.

The pressure sensor 6 is disposed—with respect to the length of the levers 4, 5—at a spacing a from the receiving geometries 12. So, in the exemplary embodiment represented, a ratio of the spacings of the pressure sensor 6 on the one hand—length 11—and the receiving geometry 12 on the other hand—length 12—from the pivoted connection 3 of the levers 4, 5 of about 1:1.415, i.e. 1:"root 2", is chosen. So, for example, the length 11 between the pivot 3 and the pressure sensor 6 may be 100 mm and the length 12 between the pivot 3 and the receiving geometry 12 may be 141.5 mm.

The two levers 4 and 5 are secured against swinging open about the pivot 3 by means of a knurled screw 15, allowing a pivoting movement of the levers 4, 5 in the pressing direction.

Figure 5:
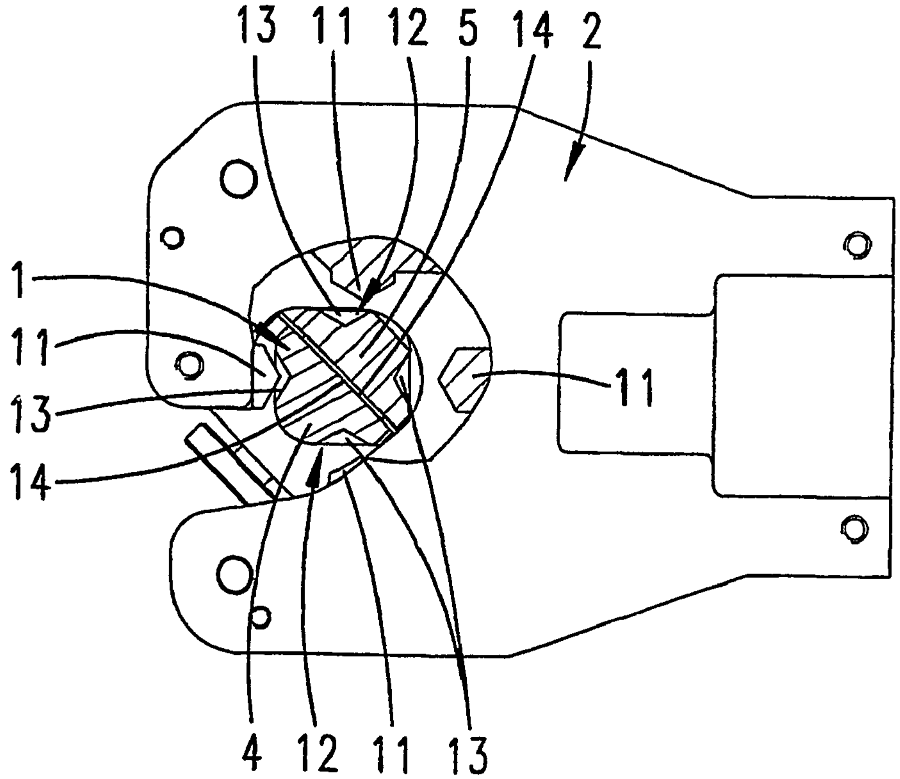
FIG. 5 shows a partially sectioned view of the set-up according to FIG. 4.
Figure 6:
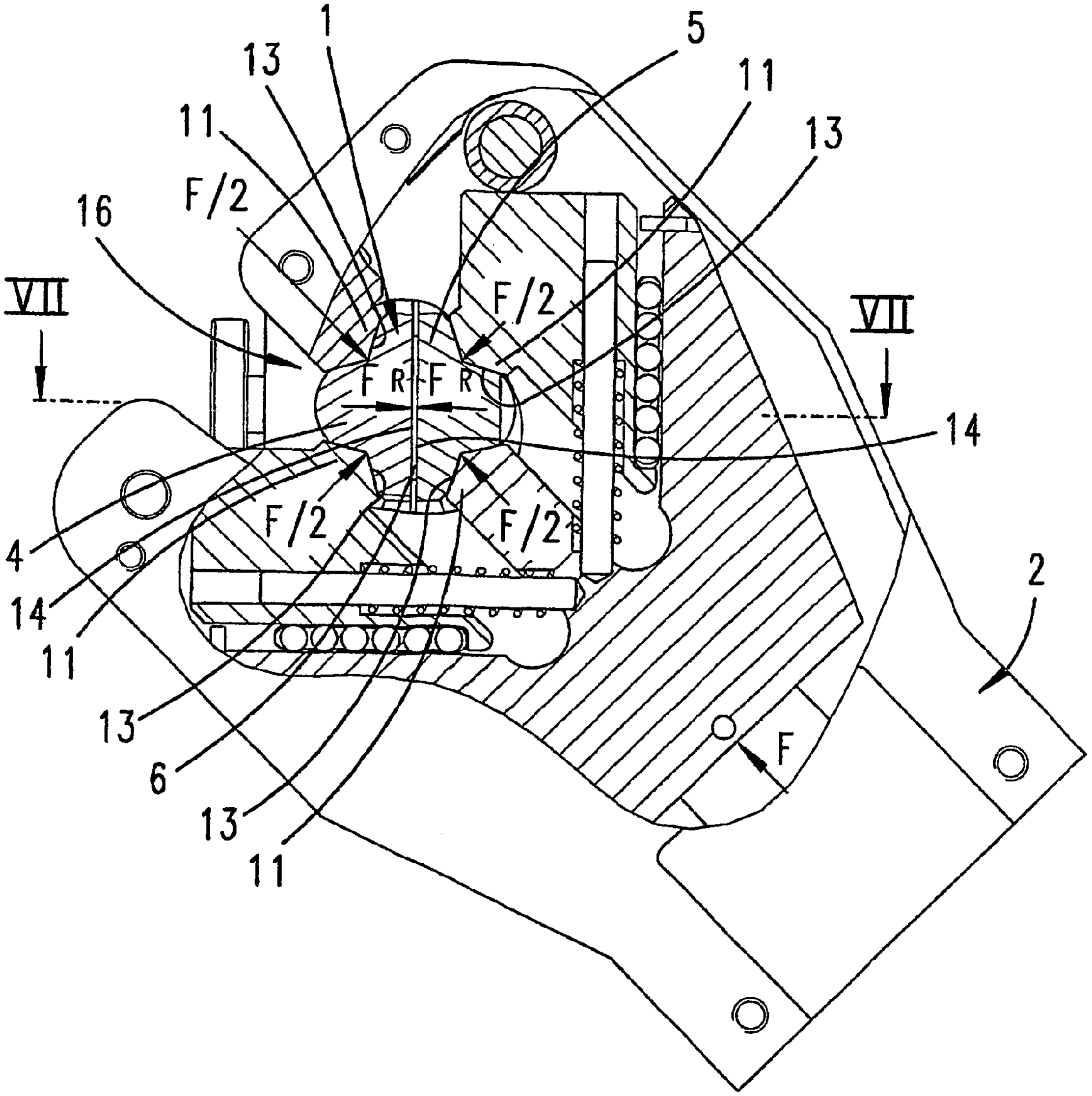
FIG. 6 shows a four-mandrel press head partially in section, with the association of the dynamometric tool acted on by the mandrels.
Figure 7:
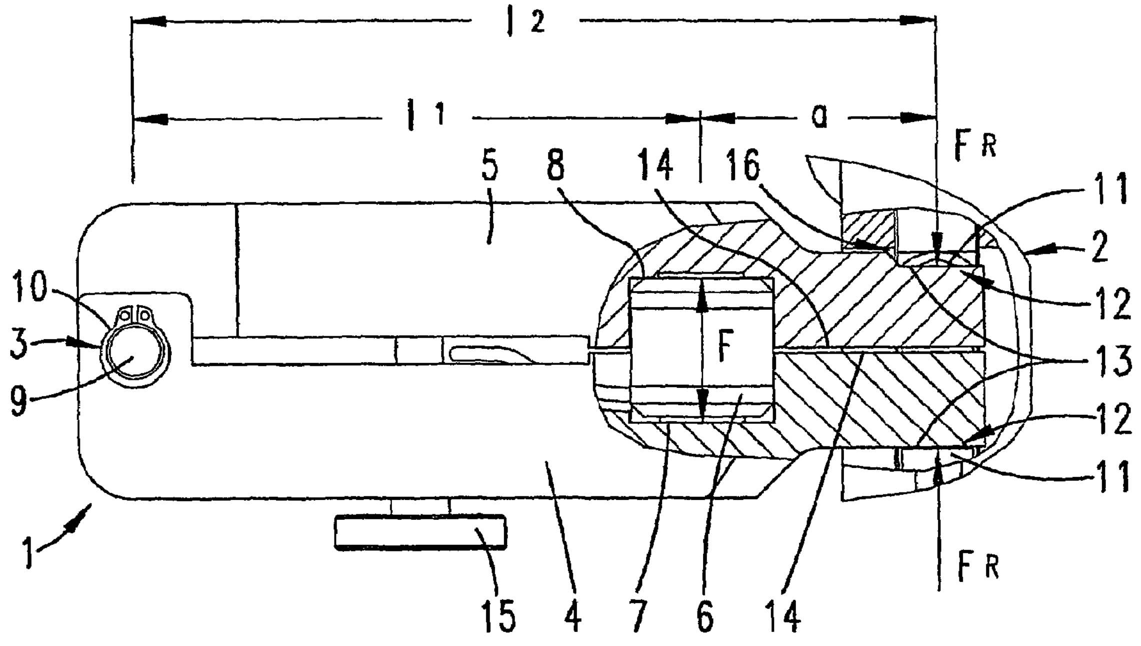
FIG. 7 shows a representation of a detail in section along the line VII—VII in FIG. 6.

The dynamometric tool 1 according to the invention is formed like a gage, in the form of a hand-held device, and, for measuring the pressing force in a press head 2, is inserted into the press mouth 16 of the press head 2 in such a way that the receiving geometries 12 or the shaped depressions 13 of the dynamometric tool 1 are aligned such that they are associated with the four press mandrels 11 (cf. FIGS. 4 and 5).

The press head 2 is, for example, associated with a hydraulic device (not represented), which, on actuation, acts on the press mandrels 11 with a pressing force F. The four press mandrels are distributed at equal angles in a cross-section according to FIG. 6, and accordingly form in each case an angle of 90° with respect to one another. As a result of the transmission ratios, each press mandrel 11 acts with half the pressing force F/2 on the item to be pressed or, as represented, on the dynamometric tool 1.

The fact that the chosen way in which the receiving geometries 12 are disposed in the region of the levers 4, 5 has the effect that half the pressing forces F/2 act at an angle beta of 45°, with respect to the parting surfaces 14 of the levers 4, 5, produces a force resultant FR which acts perpendicular to the parting surface 14 and is greater than half the pressing force F/2 by a factor of "root 2".

This factor of "root 2" is nullified by the chosen ratio of the lengths 11 and 12, with the result that the actual pressing force F in the region of the pressure sensor 6 is determined. This determined value can be indicated or else stored.

The configuration according to the invention provides a dynamometric tool 1 which, as a gage-like hand-held device, determines the actual pressing force F of a four-mandrel press head 2 in an extremely easy way.

Figure 8:
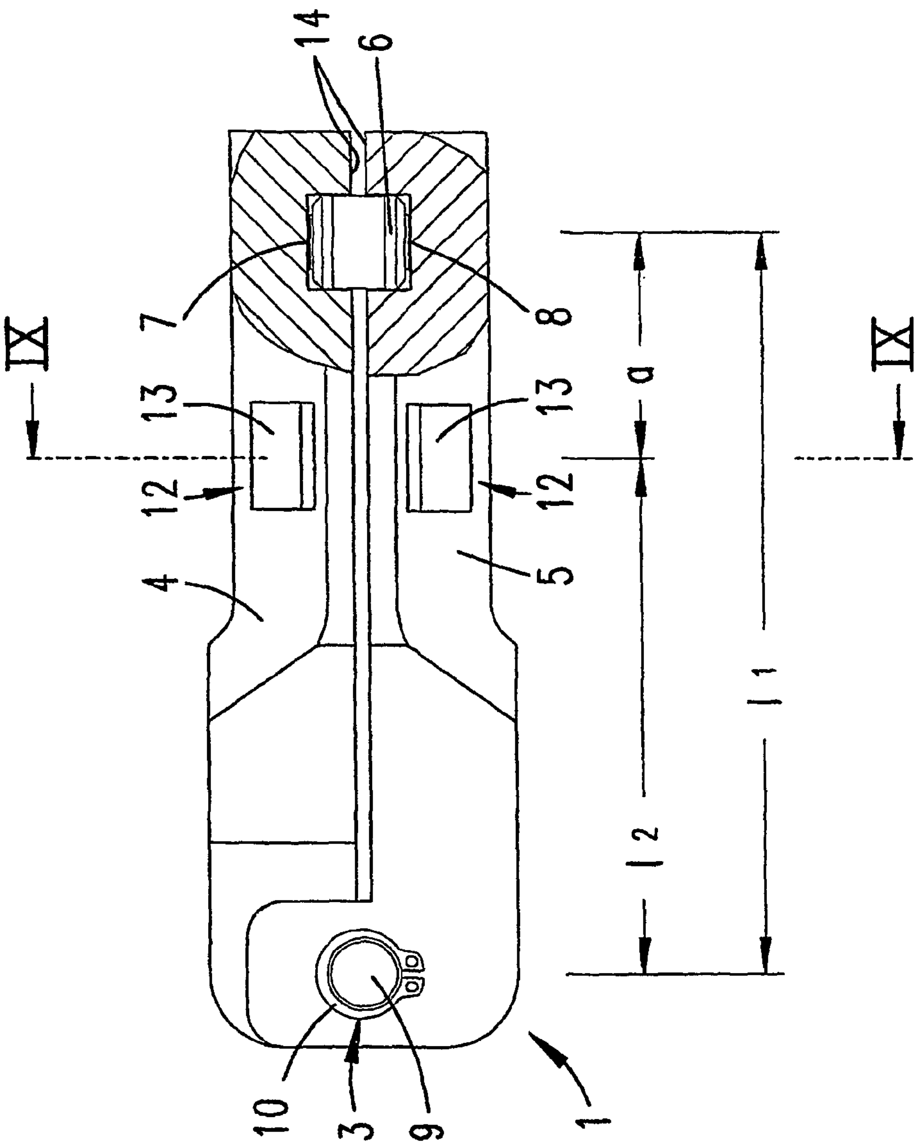
FIG. 8 shows a side view corresponding to FIG. 1, but concerning a second embodiment of the dynamometric tool.
Figure 9:
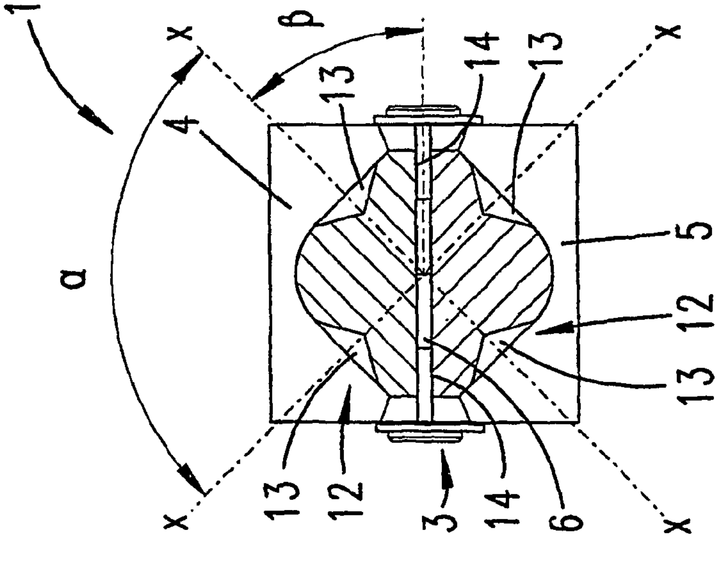
FIG. 9 shows the section along the line IX—IX in FIG. 8.

Represented in FIGS. 8 and 9 is a further exemplary embodiment of a dynamometric tool 1 according to the invention. Here, too, two levers 4, 5 are connected to each other by means of a pivot 3, having a pivot pin 9. By contrast with the previously described first exemplary embodiment, however, provided here is a set-up in which the receiving geometries 12 are formed between the free end region, in which the pressure sensor 6 is disposed, and the pivot 3. In the case of this embodiment, too, a ratio of the spacings of the pressure sensor 6 on the one hand and of the receiving geometry 12 on the other hand from the joint 3 is chosen such that, in a way corresponding to the first exemplary embodiment, the pressure sensor 6 indicates the actual pressing force F irrespective of the force transmission dictated by the way in which the press mandrels 11 are geometrically disposed. So, here a ratio of the lengths 11 between the pressure sensor 6 and the pivot 3 and the length 12 between the receiving geometry 12 and the pivot 3 of "root 2":1 is provided, to neutralize the "root 2" factor of the force resultant FR acting on the levers 4, 5.

Figure 11:
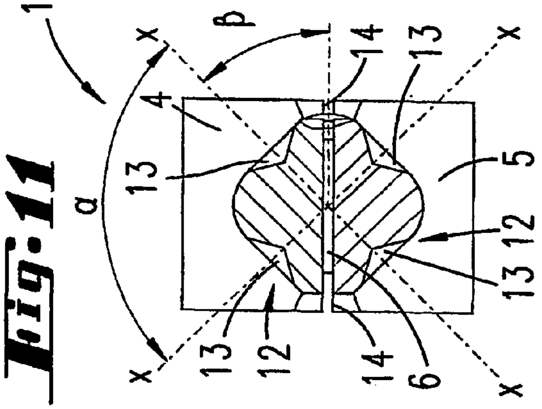
FIG. 11 shows the section along the line XI—XI in FIG. 10.
Figure 10:
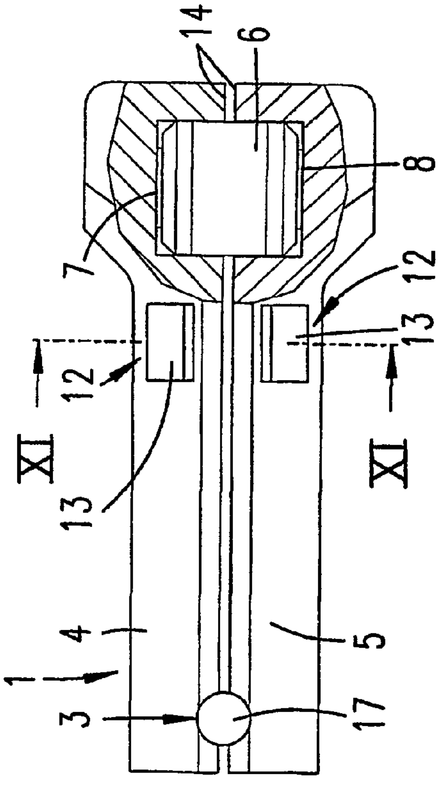
FIG. 10 shows a further embodiment of the dynamometric tool.
Figure 12:
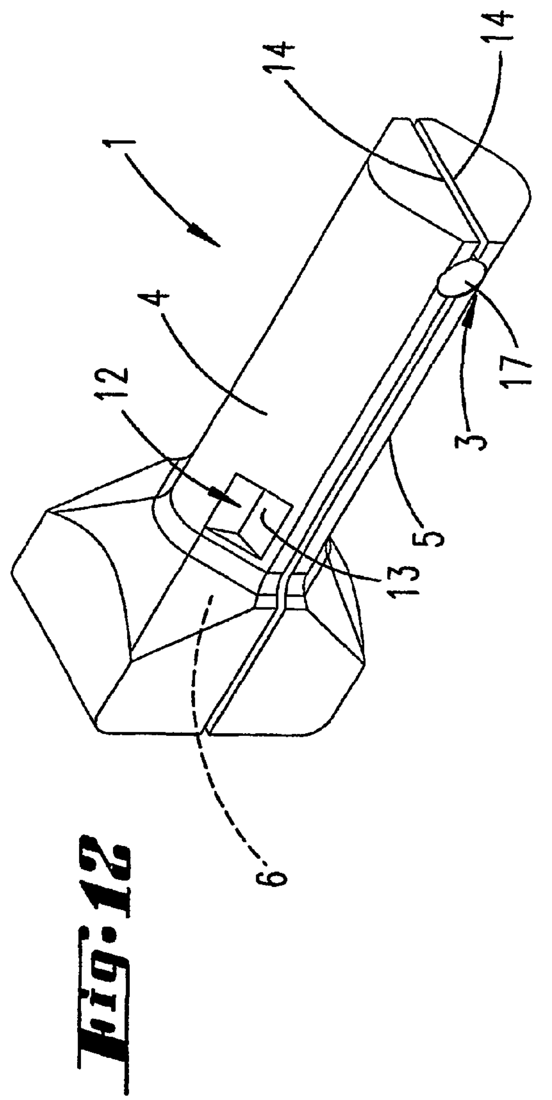
FIG. 12 shows the dynamometric tool according to FIG. 10 in a perspective individual representation.

FIGS. 10 to 12 show a further exemplary embodiment. Here, the receiving geometry 12 and the pressure sensor 6 are disposed in the same way as in the previously described exemplary embodiment according to FIGS. 8 and 9. Here, too, the spacing ratios 11 to 12 are chosen as "root 2":1. In this exemplary embodiment, a roller bearing 17 is chosen as the pivot 3.

A further alternative configuration of the dynamometric tool 1 according to the invention is represented in FIGS. 13 to 15. Here, the receiving geometry 12 or the shaped depressions 13 are formed midway along the levers 4, 5. Pressure sensors 6 are provided on both sides of these receiving geometries 12.

Figure 16:
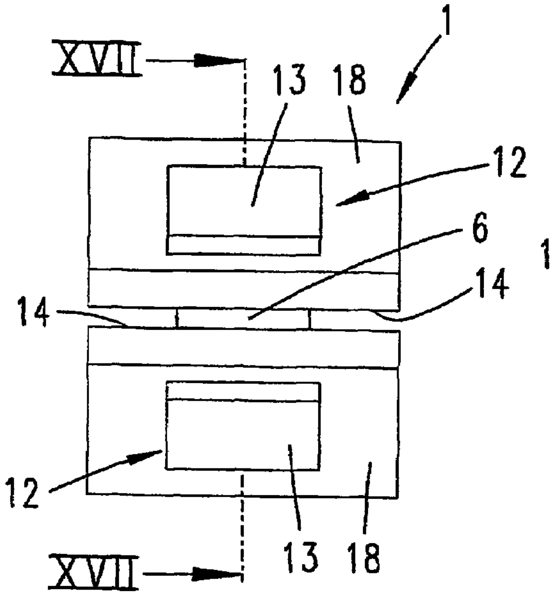
FIG. 16 shows the dynamometric tool in a further embodiment.
Figure 17:
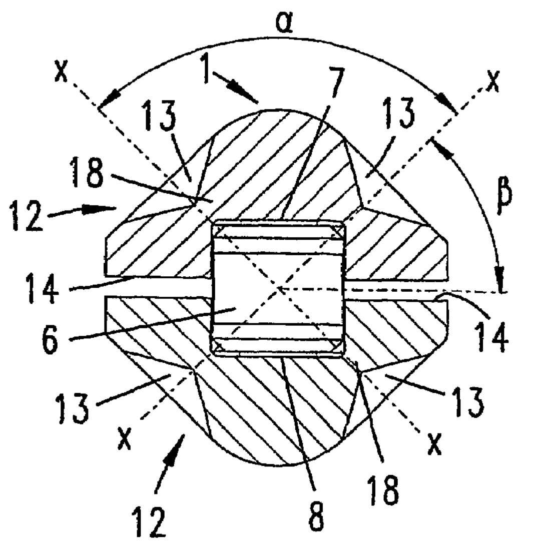
FIG. 17 shows the section along the line XVII—XVII in FIG. 16.
Figure 18:
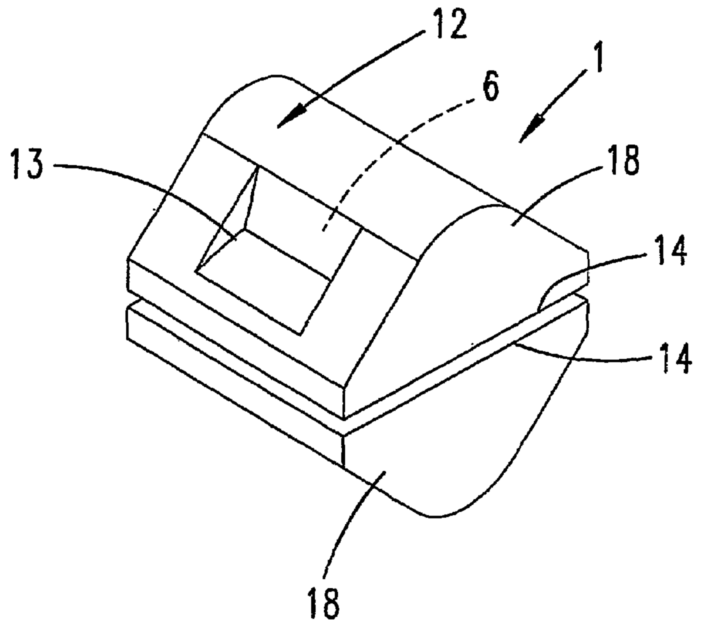
FIG. 18 shows the perspective representation of the dynamometric tool according to FIG. 16.

As a further alternative, according to the exemplary embodiment in FIGS. 16 to 18 it is possible to choose a set-up providing two thrust pieces 18 which are adapted to the pressing geometry of the press mandrels 11 and act on a pressure sensor 6 disposed between these thrust pieces 18 in the course of pressing by the press head 2. Here, too, in a way corresponding to the previously described exemplary embodiments, the thrust pieces 18 have receiving geometries 12 for the press mandrels 11 that are joined together and adapted to the pressing geometry. The pressure sensor 6 and these receiving geometries 12 are disposed in the same region, preferably in the central region of the thrust pieces 18.

All disclosed features are (in themselves) pertinent to the invention. The disclosure content of the associated/attached priority documents (copy of the prior patent application) is also hereby incorporated in full in the disclosure of the application, including for the purpose of incorporating features of these documents in claims of the present application.

What is claimed is:

1. A dynamometric tool for a four-mandrel press head, the four-mandrel press head having a pressing geometry predefined by mandrels, said dynamometric tool configured to be placed in the four-mandrel press head such that the mandrels of the four-mandrel press head act on said dynamometric tool, said dynamometric tool comprising two levers which are joined together and adapted to the pressing geometry of the four-mandrel press head, said two levers configured to act on a pressure sensor in order to sense a pressing force of said two levers in the course of pressing.

2. The dynamometric tool as defined in claim 1, wherein the two levers are connected to each other at one end at a pivot point and, on the opposite side, end in a freely projecting manner to define a free end region of the two levers.

3. The dynamometric tool as defined in any preceding claim, wherein a receiving geometry for the mandrels is respectively formed on the two levers.

4. The dynamometric tool as defined in claim 3, wherein the pressure sensor is disposed at a spacing from the receiving geometry, with respect to a length of the two levers.

5. The dynamometric tool as defined in claim 4, wherein a ratio of a spacing from the pressure sensor to the pivot point and a spacing from the receiving geometry to the pivot point is chosen such that the pressure sensor indicates an actual pressing force irrespective of a force transmission dictated by the way in which the mandrels are geometrically disposed.

6. The dynamometric tool as defined in claim 3, wherein the receiving geometry is associated with the free end region, while the pressure sensor is disposed in an associated manner between the pivot point and the receiving geometry.

7. The dynamometric tool as defined in claim 3, wherein the receiving geometry is disposed between the free end region, with which the pressure sensor is also associated, and the pivot point.

8. The dynamometric tool as defined in claim 3, wherein the receiving geometry is arranged midway along the two levers and pressure sensors are provided on both sides of the receiving geometry.

9. A dynamometric tool for a four-mandrel press head, the four-mandrel press head having a pressing geometry defined by mandrels, said dynamometric tool configured to be placed in the four-mandrel press head such that the mandrels of the four-mandrel press head act on said dynamometric tool, said dynamometric tool comprising two thrust pieces which are adapted to the pressing geometry and are configured to act on a pressure sensor in order to sense a pressing force of said two thrust pieces in the course of pressing.

10. The dynamometric tool as defined in claim 9, wherein a receiving geometry for the mandrels is respectively formed on the thrust pieces.

11. The dynamometric tool according to claim 9 or 10, wherein the pressure sensor and the receiving geometries are disposed in the same region of the thrust pieces.

* * * * *

UNITED STATES PATENT AND TRADEMARK OFFICE

CERTIFICATE OF CORRECTION

PATENT NO. : 6,966,230 B2
DATED : November 22, 2005
INVENTOR(S) : Egbert Frenken It is certified that error appears in the above-identified patent and that said Letters Patent is hereby corrected as shown below:

Column 1,
Line 7, add the following paragraph:
-- The invention relates to a dynamometric tool for a four-mandrel press head, the four-mandrel press head having a pressing geometry predefined by the mandrels. --.

Signed and Sealed this

Twenty-eighth Day of February, 2006

JON W. DUDAS
*Director of the United States Patent and Trademark Office*